United States Patent
Skjoldborg

(10) Patent No.: US 10,481,632 B2
(45) Date of Patent: Nov. 19, 2019

(54) APPARATUS WITH INTER-COMMUNICATING PROCESSORS

(71) Applicant: GN Audio A/S, Ballerup (DK)

(72) Inventor: Erling Skjoldborg, Ballerup (DK)

(73) Assignee: GN AUDIO A/S (DK)

( * ) Notice: Subject to any disclaimer, the term of this patent is extended or adjusted under 35 U.S.C. 154(b) by 196 days.

(21) Appl. No.: 15/840,565

(22) Filed: Dec. 13, 2017

(65) Prior Publication Data

US 2018/0188768 A1 Jul. 5, 2018

(30) Foreign Application Priority Data

Dec. 30, 2016 (EP) .................................. 16207602

(51) Int. Cl.
*G06F 13/42* (2006.01)
*G06F 1/06* (2006.01)
*G06F 13/362* (2006.01)
*H04R 3/00* (2006.01)

(52) U.S. Cl.
CPC .............. *G06F 1/06* (2013.01); *G06F 13/362* (2013.01); *H04R 3/00* (2013.01); *H04R 2420/07* (2013.01)

(58) Field of Classification Search
CPC .... G06F 13/4273; G06F 1/06; G06F 13/4269; H04R 3/00; H04R 2420/07
See application file for complete search history.

(56) References Cited

U.S. PATENT DOCUMENTS

2012/0246505 A1  9/2012  Ma et al.
2014/0129858 A1  5/2014  Varma et al.
2016/0246570 A1* 8/2016  Mishra ...................... G06F 5/16
2016/0259702 A1* 9/2016  Mishra ................ G06F 11/3051
2017/0290062 A1* 10/2017 Balasingh ......... H04W 74/0825

FOREIGN PATENT DOCUMENTS

WO    WO 99/23787      5/1999
WO    WO 2014/055957   4/2014

OTHER PUBLICATIONS

Extended European Search Report dated Jul. 10, 2017 for European patent application No. 16207602.0.

* cited by examiner

*Primary Examiner* — Farley Abad
(74) *Attorney, Agent, or Firm* — Hamre, Schumann, Mueller & Larson, P.C.

(57) ABSTRACT

This disclosure concerns an apparatus of multiple processors, such as microprocessors and communications therebetween and enables efficient half-duplex two-way communication between two processors, each having two logic output pins and two logic input pins, e.g. GPIO pins, available for the communication. For each of the first and the second processor (101, 102), the first logic output pin (11, 21) is connected to the second logic input pin (14, 24) of the respective other processor (101, 102), and for each of the first and the second processor (101, 102), the second logic output pin (12, 22) is connected to the first logic input pin (13, 23) of the respective other processor (101, 102). Each of the first and the second processor (101, 102) is operable in a transmit mode by controlling the second logic output pin (12, 22) and in a receive mode by determining a sequence of data bits (D7-D0) from the logic data signal (DAT) received on the first logic input pin (13, 23) in response to state transitions of the logic clock signal (CLK) received on the second logic input pin (14, 24).

15 Claims, 5 Drawing Sheets

APPARATUS WITH INTER-COMMUNICATING PROCESSORS

The present invention concerns an apparatus comprising multiple processors, such as microprocessors, that communicate with each other.

Many known processors, such as microprocessors, comprise one or more interfaces or ports for communicating with other devices. Typically, the obtainable data rate on a port depends on the type and speed of the processor, the type of the port as well as on what communication resources are available in the processor. The data rate on a port may thus be limited if e.g. only a few processor pins are available to the port, the processor has a low clock rate, dedicated communication circuits are not available, such communication circuits have a low clock rate, interrupt circuits are not available and/or program memory or processing time for communication routines is limited in the processor.

Various port types are known from the prior art, which includes both parallel ports and serial ports. For the same data rates, parallel ports generally require a larger number of processor pins than serial ports, while serial ports generally require more of other communication resources.

A Universal Asynchronous Receiver/Transmitter (UART) is a well-known type of dedicated communication circuit that is commonly used to control serial communication over distances in the meter range through serial ports, such as e.g. RS-232, RS-422 and RS-485 ports. Many microprocessors comprise one or two ports with respective UART circuits that enable the microprocessors to communicate efficiently with other devices. A UART circuit is typically hosted on a dedicated integrated circuit die or hosted as a portion of a more complex integrated circuit die, such as that of a microcontroller.

The also well-known Inter-Integrated Circuit (I2C) is a master-slave serial communication bus, which is typically used for connecting integrated circuits over distances in the centimetre range, such as between microprocessors and/or other electronic devices on shared printed circuit boards. Many microprocessors and other electronic devices comprise dedicated I2C circuits.

Dedicated communication circuits, such as UART circuits and I2C circuits, can typically be emulated, e.g. by programmable logic circuits in a processor and/or by software running on a microprocessor. For instance, a microprocessor may comprise program instructions defining a set of communication routines that enable it to control a number of so-called General Purpose Input Output (GPIO) pins in a way that emulates a communication circuit. However, such communication routines may be relatively complex and may thus exhaust program memory and/or limit processing time available to other routines in the microprocessor.

In view of the above, there is a need for an apparatus with multiple processors, wherein two logic output pins and two logic input pins, e.g. GPIO pins, on each of the processors may suffice for efficient half-duplex two-way communication between two processors.

SUMMARY

The claimed apparatus provides communication between two or more processors, such as microprocessors, and enables efficient half-duplex two-way communication between two processors, each having only two logic output pins and two logic input pins, e.g. GPIO pins, available for the communication.

The apparatus allows each processor to poll or otherwise read the states of the input pins at random intervals and update the states of the output pins at fastest possible speed, while at the same time ensuring that no data are lost.

The apparatus allows for fast communication on four logic lines between two processors that do not have dedicated communication hardware like I2C or UART circuits.

An advantage of the apparatus is that communication may take place as fast as the processors allow and that the apparatus adapts its rate of data transfer to changes in computation and/or interrupt load on the processors since it does not use a fixed clock.

It is a further advantage, but not a requirement, that one or both of the processors may utilize interrupts if available for pins used for communication.

The claimed apparatus overcomes problems related to serial communication between processors, such as programmable integrated semiconductor circuits, wherein the processors may have dedicated serial ports, such as I2C compliant serial ports, that are hardwired to communicate with other processors, but where one or more additional serial ports are needed.

The claimed apparatus overcomes problems related to one of the processors receiving or transmitting data bits at a slower data rate than the other one transmits or receives, respectively. Reasons for a slower data rate may relate to a processor having fewer resources, running at a slower clock rate, being busy performing other tasks and/or that buffering of data bits being transmitted or received is relatively slow for one reason or another.

These and other objects of the invention are achieved by the invention defined in the independent claims and further explained in the following description. Further objects of the invention are achieved by embodiments defined in the dependent claims and in the detailed description of the invention.

Here and in the following, the term 'processor' refers to any electronic circuit and/or electronic device suitably adapted to perform the functions described herein. In particular, such circuits and devices comprise general purpose and/or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits etc., as well as combinations of such circuits or devices.

Furthermore, the term 'logic signal' refers to a signal that can assume an asserted state at some times and a released state at other times. The term 'logic input pin' in relation to a processor refers to a physical terminal of that processor that can receive a logic signal from another device and distinguish the states of the received logic signal. The term 'logic output pin' in relation to a processor refers to a physical terminal of that processor that can transmit a logic signal to another device and control the state of the transmitted logic signal. The term 'logic pin' refers to any of a logic input pin and a logic output pin. The term 'logic line' refers to a connection that is able to transfer a logic signal from a logic output pin of one device to a logic input pin of another device.

For ease of reading, the above defined terms may be abbreviated in the following; for instance, the notation 'pin' may be used for 'logic pin', 'input pin' may be used for 'logic input pin', 'output pin' may be used for 'logic output pin', 'signal' may be used for 'logic signal' and 'line' may be used for 'logic line'.

Within this document, the singular forms "a", "an", and "the" are intended to include the plural forms as well (i.e. to have the meaning "at least one"), unless expressly stated otherwise. Correspondingly, the terms "has", "includes", "comprises", "having", "including" and "comprising" specify the presence of respective features, operations, elements and/or components, but do not preclude the presence or addition of further entities. The term "and/or" generally includes all combinations of one or more of the associated items. The steps or operations of any method disclosed herein need not be performed in the exact order disclosed, unless expressly stated so. The terms "then" and "and then" should imply a sequential (step-by-step) execution. Execution of a step following "then" and "and then" may depend on a successful execution of a preceding step as it is known in the art of programming.

BRIEF DESCRIPTION OF THE FIGURES

A more detailed description follows below with reference to the drawing, in which.

DETAILED DESCRIPTION

Figure 1:
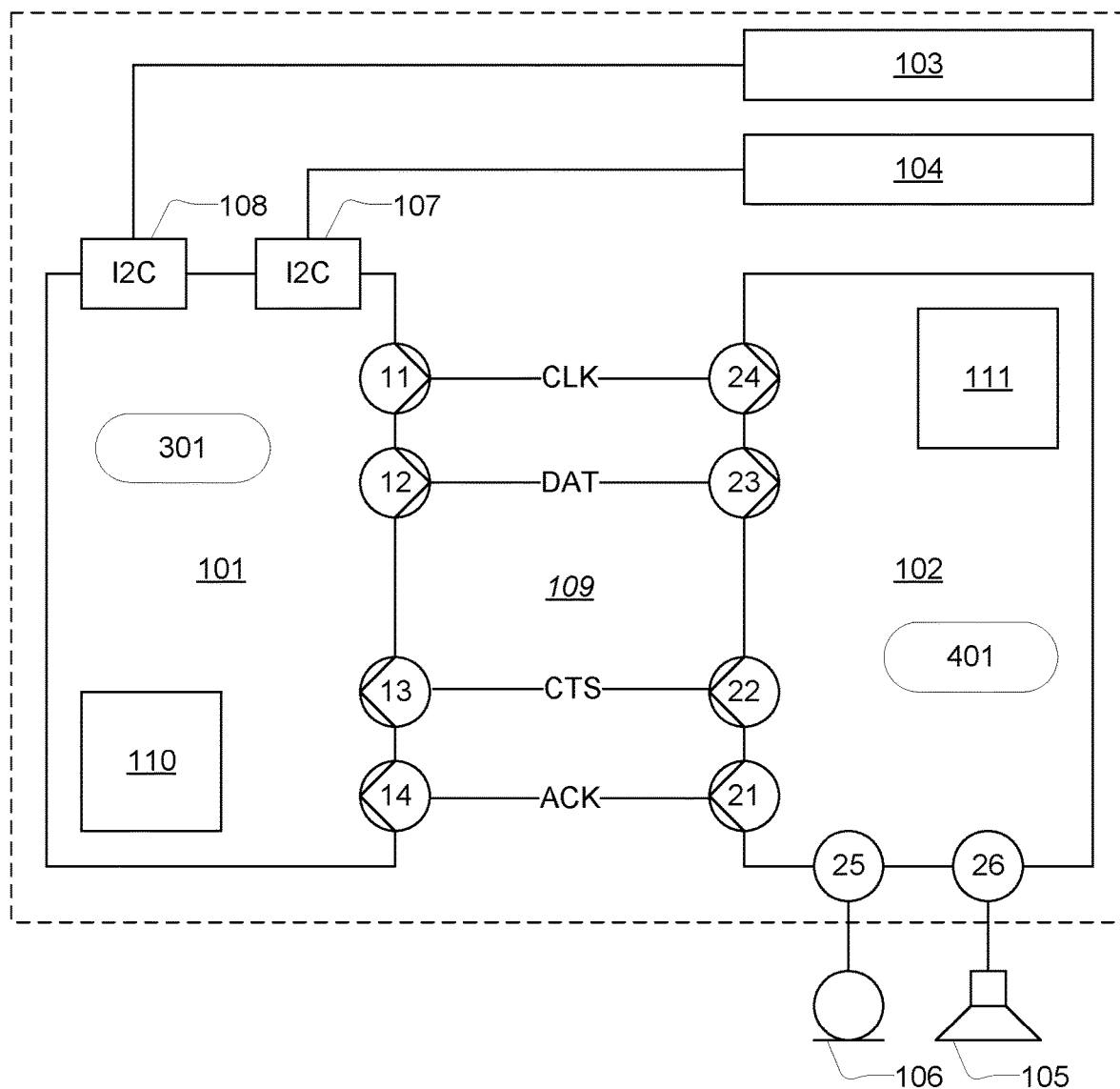
FIG. 1 shows a block diagram of an apparatus with a first processor and a second processor, wherein the first processor is in a transmit mode and the second processor is in a receive mode.

FIG. 1 shows a block diagram of an apparatus with a first processor 101 and a second processor 102. The apparatus 109 may e.g. be embodied as a printed circuit board carrying a first integrated circuit comprising the first processor 101 and a second integrated circuit comprising the second processor 102. The integrated circuits may e.g. be embodied as respective semiconductor dies. The apparatus 109 may alternatively be embodied as e.g. multiple printed circuit boards, each comprising a respective one of the first and second processors 101, 102, interconnected via e.g. a physical bus of wires or other connectors, such as e.g. via a so-called flat cable and/or via a physical connector with multiple terminals. As a further alternative, a circuit board may comprise one or more flexible portions interconnecting rigid portions, wherein the first processor 101 and the second processor 102 are interconnected via a flexible portion.

One or both of the first processor 101 and the second processor 102 may be programmable processors as it is known in the art for some standard processors e.g. for microcontrollers, but also from custom-made processors.

As an illustrative example, the first processor 101 comprises communication ports such as a first I2C port 108 and a second I2C port 107 connected with respective devices 103 and 104. The devices 103 and 104 may be processors such as programmable processors. Additionally, the first processor 101 comprises a first and a second logic output pin 11, 12 as well as a first and a second logic input pin 13, 14. Likewise, the second processor 102 comprises a first and a second logic output pin 21, 22 as well as a first and a second logic input pin 23, 24. The second processor 102 also comprises two ports 25 and 26 for communicating analogue signals and/or digital signals with respectively a microphone 106 and a loudspeaker 105.

Figure 3:
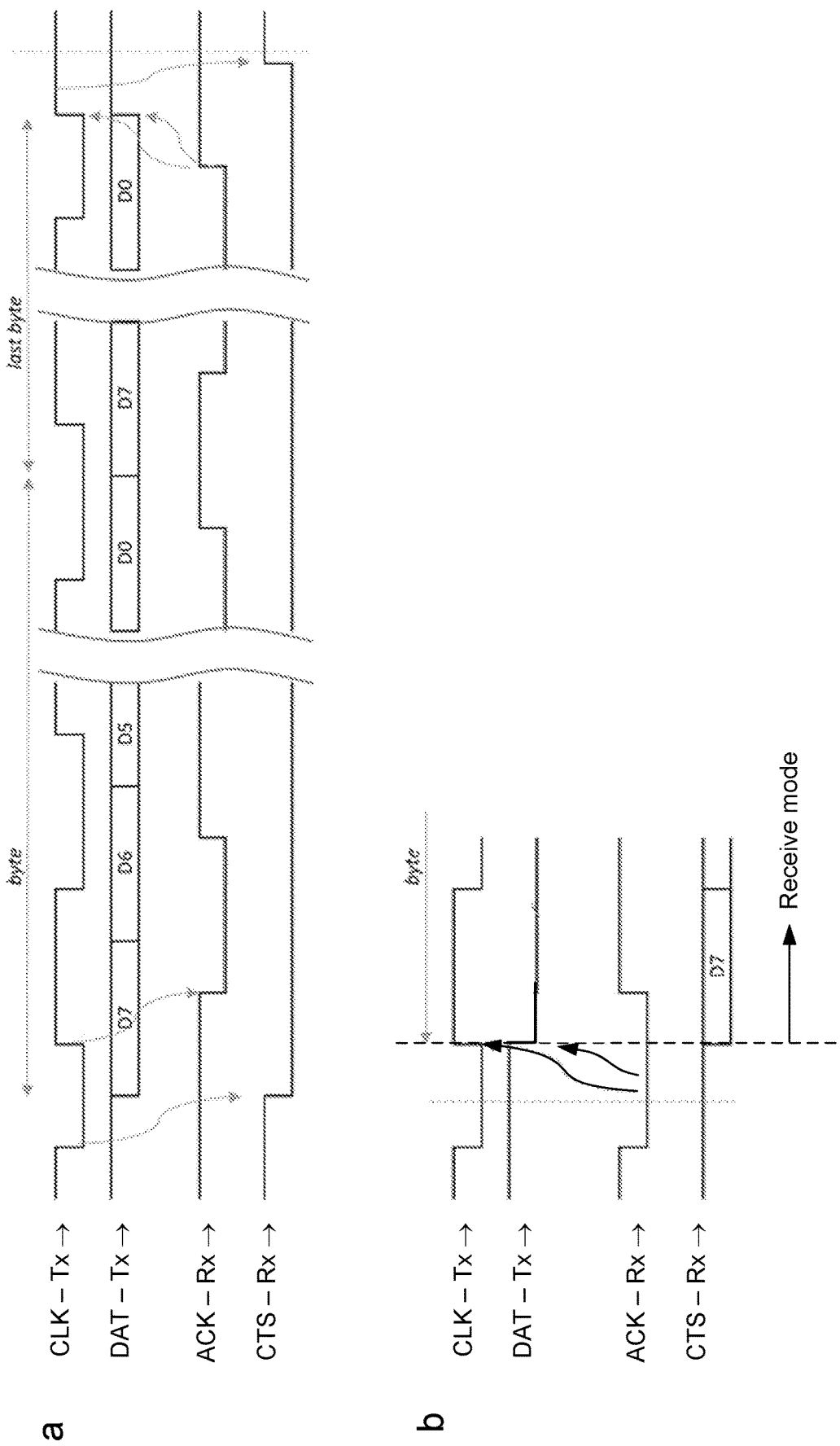
FIG. 3 shows a timing diagram illustrating communication between the first processor and the second processor.

The first output pin 11 of the first processor 101 is connected to the second input pin 24 of the second processor 102 via a first logic line. Similarly, the second output pin 12 of the first processor 101 is connected to the first input pin 23 of the second processor 102 via a second logic line; the first input pin 13 of the first processor 101 is connected to the second output pin 22 of the second processor 102 via a third logic line; and the second input pin 14 of the first processor 101 is connected to the first output pin 21 of the second processor 102 via a fourth logic line. In FIG. 1, the shown line functions CLK, DAT, CTS, ACK of the lines correspond to a first mode of the apparatus 109 wherein the first processor 101 is in a transmit mode 301 and the second processor 102 is in a receive mode 302. In the first mode of the apparatus, the first line functions as a clock line CLK from the first processor 101 to the second processor 102, the second line functions as a data line DAT from the first processor 101 to the second processor 102, the third line functions as a clear-to-send line CTS from the second processor 102 to the first processor 101, and the fourth line functions as a data-acknowledge line ACK from the second processor 102 to the first processor 101. The line functions CLK, DAT, CTS, ACK are explained further in the description of FIGS. 3-5.

In some embodiments of the apparatus, the pins 11-14, 21-24 may be embodied as electric pins. Correspondingly, the lines interconnecting the pins 11-14, 21-24 may be embodied as e.g. bare wires or isolated wires, as paths or lanes in a metal or otherwise electrically conductive layer of a circuit board, etc. as it is known in the art related to transmission of electric signals. In other embodiments of the apparatus, one or more of the pins 11-14, 21-24 may be embodied as optical terminals and, correspondingly, the respective lines or parts thereof may be embodied as e.g. light ducts, optical fibres, etc. as it is known in the art related to transmission of optical signals. Alternatively, or additionally, other types of pins or terminals may be used, and correspondingly, some or all logic signals may be encoded in any known way in signals of any known type, such as e.g. magnetic signals, radio-frequency signals or capacitive signals, and be transferred via lines adapted for transmission of such signal types. Where required or suitable, terminals and/or lines may comprise any number of converters, encoders, decoders, repeaters, filters, buffers, amplifiers etc. for conversion between signals of different types and/or for enabling or improving transmission and/or reception of such signals.

One or both of the processors 101, 102 may be a programmable processor. The first processor 101 and the second processor 102 may perform data communication via the pins 11-14, 21-24 and the interconnecting lines under control of one or more respective programs 110, 111 loaded into a program memory of respectively the first processor 101 and/or the second processor 102. In some embodiments, one or more of the processors 101, 102 may comprise an interrupt circuit configured to monitor assertion and/or releasing of a signal received on an input pin 13, 14, 23, 24 as well as to trigger execution of an interrupt routine comprised by the respective program 110, 111 in dependence on detecting assertion and/or releasing of that signal. Thus, such interrupt circuits may help avoid or reduce the amount of polling operations required for communication between the processors 101, 102.

Embodiments may comprise other configurations of the apparatus 109 and the processors 101, 102. The apparatus 109 shown in FIG. 1 may e.g. form part of a listening device, such as e.g. a headset base, a wired or wireless headset, a hearing aid or the like, or of any part hereof.

Figure 2:
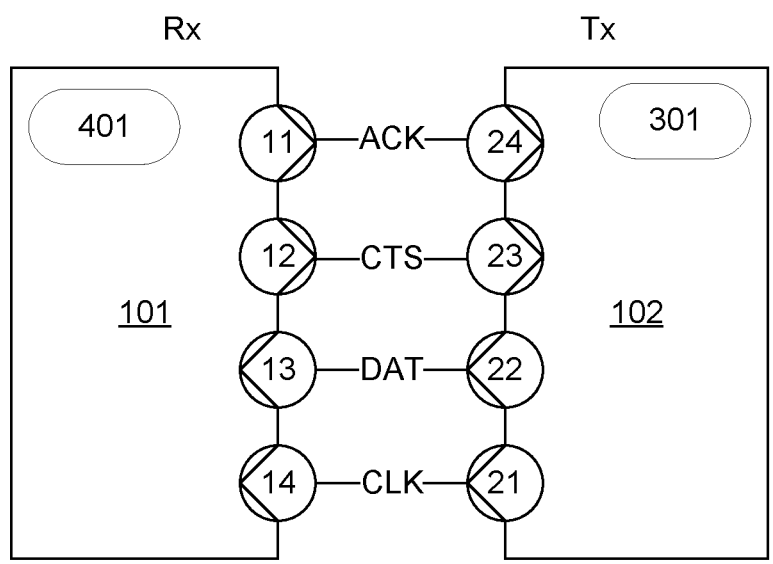
FIG. 2 shows a block diagram of the apparatus, wherein the first processor is in a receive mode and the second processor is in a transmit mode.

FIG. 2 shows a block diagram illustrating a second mode of the apparatus of FIG. 1 wherein the first processor 101 is in a receive mode 401 and the second processor 102 is in a transmit mode 301, i.e. with the processors 101, 102 having modes swapped compared to FIG. 1. Correspondingly, the line functions CLK, DAT, CTS, ACK have reversed directions compared to FIG. 1. In particular, in order to allow for an efficient and well-controlled change from the first mode into the second mode—or vice versa, the functions CLK and ACK of the first and the fourth line are swapped with each other and the functions DAT and CTS of the second and the third line are swapped with each other. Thus, in the second mode of the apparatus 109, the first line functions as a data-acknowledge line ACK from the first processor 101 to the second processor 102, the second line functions as a clear-to-send line CTS from the first processor 101 to the second processor 102, the third line functions as a data line DAT from the second processor 102 to the first processor 101, and the fourth line functions as a clock line CLK from the second processor 102 to the first processor 101.

FIG. 3a shows a timing diagram illustrating data transmission between the first processor 101 and the second processor 102 shown in FIGS. 1 and 2.

The timing diagram illustrates signal states over time on the clock line CLK, the data line DAT, the data-acknowledge line ACK and the clear-to-send line CTS. All lines CLK, DAT, CTS, ACK are shown as 'idle high', such that 'high' corresponds to the respective signal being in the released state and 'low' corresponds to the respective signal being in the asserted state. Note that signal states may be encoded in any way known in the art related to binary logic without departing from the scope of the invention, e.g. as predefined voltage levels, current levels, light intensities, radio frequencies, etc. The timing diagram shows transmission of a data packet comprising two data bytes, each with 8 bits D7-D0. In the figure, time progresses rightwards.

In periods without data transmission, the apparatus is in a third mode, wherein both the first processor 101 and the second processor 102 are in a receive mode 401. In the third mode, each processor 101, 102 assumes line functions CLK, DAT, CTS, ACK corresponding to its respective receive mode 401. Thus, the first processor 101 assumes line functions CLK, DAT, CTS, ACK as shown in FIG. 2 wherein the first processor 101 is shown in a receive mode 401, and the second processor 102 assumes line functions CLK, DAT, CTS, ACK as shown in FIG. 1 wherein the second processor 102 is shown in a receive mode 401. In the following, the third mode of the apparatus will be referred to as 'idle mode'. In the idle mode, the signals on all lines CLK, DAT, CTS, ACK are in the released state, which is shown as 'high' in the timing diagram, and which occurs in the timing diagram both before and after the data transmission.

In the idle mode of the apparatus, a processor 101, 102 may initiate a transmission, i.e. indicate a 'request to send' to the respective other processor 101, 102, by asserting the signal on the respective clock line CLK—assuming line functions corresponding to the transmit mode 301 of the initiating processor. Thus, each processor 101, 102 monitors the clock line CLK from the respective other processor 101, 102. The first processor 101 monitors the signal on the fourth line through the second input pin 14 and the second processor 102 monitors the signal on the first line through the fourth input pin 24. When a processor 101, 102 detects assertion of the clock signal CLK, i.e. the signal on the clock line CLK, it responds as described below for the receiver role, unless it has itself initiated a transmission, in which case the conflicting requests, also known as 'contention', are resolved as described further below. In general, a processor 101, 102 may monitor a line by polling the respective input pin 13, 14, 23, 24 and/or by reacting to one or more interrupts generated by an interrupt circuit for such a pin.

In the following, phrases like 'asserting a signal', 'releasing a signal' and 'monitoring a signal' are used as shorthand for respectively controlling an output pin to assert the respective signal, for controlling an output pin to release the respective signal and for determining the state of the respective signal through an input pin. Furthermore, phrases like 'toggling a signal' are used as shorthand for controlling an output pin to toggle the state of the respective signal, i.e. to cause a transition of the state of the signal into the respective other one of the asserted and released states. In addition, a named signal, such as e.g. 'clock signal CLK' refers to the signal on the particular line having the line function corresponding to the signal name. Note that which particular line is thereby referred to, generally depends on the mode of the processor 101, 102 that controls or determines the state of the signal.

Any of the first processor 101 and the second processor 102 may initiate a transmission at any time upon determining that all lines CLK, DAT, CTS, ACK are in the released state and that the apparatus is thus in the idle mode. Unless a contention is detected upon initiation of the transmission (see further below), the initiating processor 101, 102 thereby takes on the role of transmitter and the respective other processor 101, 102 takes on the role of receiver. When initiating the transmission, the respective transmitter assumes line functions CLK, DAT, CTS, ACK corresponding to its transmit mode 301. Thus, in the case that the first processor 101 initiates a transmission, it assumes line functions CLK, DAT, CTS, ACK as shown in FIG. 1, wherein the first processor 101 is shown in a transmit mode 301, and in the case that the second processor 102 initiates a transmission, it assumes line functions CLK, DAT, CTS, ACK as shown in FIG. 2, wherein the second processor 102 is shown in a transmit mode 301. The respective receiver maintains line functions as in the idle mode, such that for the remainder of the data transmission, the first and the second processor 101, 102 assume line functions CLK, DAT, CTS, ACK according to the same one of the first and the second mode of the apparatus 109.

The data transmission shown in FIG. 3a is described in the following as taking place with the first processor 101 having the role of transmitter and the second processor 102 having the role of receiver, i.e. with the first processor 101 in a transmit mode 301 and the second processor 102 in a receive mode 302 as shown in FIG. 1. However, the following description applies to both the first and the second mode of the apparatus, due to the above described swapping of the line functions and the inherent reversing of their directions, and only the specific numbering of items mentioned needs to be changed for the description to fit the second mode of the apparatus as shown in FIG. 2.

The transmitter 101 initiates the transmission by asserting the clock signal CLK, i.e. by controlling the first output pin 11 to assert the signal on the first line, which functions as a clock line CLK in the first mode of the apparatus. In the timing diagram, this is the first, or leftmost, event and is indicated by the CLK line going 'low'. Thereafter, the transmitter 101 monitors the clear-to-send signal CTS for assertion by the receiver 102. In order to enable detection of contention, the transmitter 101 also monitors the data-acknowledge signal ACK for assertion by the receiver 102. Note that the acknowledge line ACK of the transmitter 101 corresponds to the clock line CLK of the other processor 102 when the latter is in a transmit mode 301. Therefore, in the case that the second processor 102 were simultaneously initiating a data transmission, the transmitter 101 would see an assertion of the acknowledge signal ACK instead of an assertion of the clear-to-send signal CTS. This would indicate a contention, which is illustrated in FIG. 3b. The resolution of a contention is described further below.

FIG. 3a shows initiation end execution of data transmission without contention. In this case, upon detecting assertion of the clock signal CLK, the receiver 102 responds by asserting the clear-to-send signal CTS in order to signal to the transmitter 101 that the receiver 102 is ready to receive data. Subsequently, upon detecting assertion of the clear-to-send signal CTS from the receiver 102, the transmitter 101 transmits the first bit D7 of the data to be transmitted.

The transmitter 101 transmits the first data bit D7 by asserting or releasing the data signal DAT depending on the value of the data bit D7 and subsequently toggling the clock signal CLK. The transmitter 101 may apply a short delay before toggling the clock signal CLK to allow for e.g. differences in signal propagation times on involved lines and pins. Without this delay, there may be a risk that a difference in propagation times could cause erroneous detection of a data bit at the receiver 102. The delay may be provided e.g. by program instructions and/or by hardware, such as one or more signal buffers in the first and/or the fourth line that may both function as clock lines CLK. Upon detecting toggling of the clock signal CLK, the receiver 102 reads the state of the data signal DAT to determine the value of the data bit D7 and subsequently responds by toggling the data-acknowledge signal ACK in order to signal to the transmitter 101 that the receiver 102 has successfully read the transmitted data bit D7. Upon detecting toggling of the data-acknowledge signal ACK, the transmitter 101 proceeds with transmission of the second data bit D6 in the same way as the transmission of the first data bit D7, and the receiver 102 reads the second data bit D6 in the same way as reading the first data bit D7.

The above exchange or transmission of data bits continues until all of the data bits D7-D0 have been transmitted. The receiver 102 keeps track of the number of data bits received, and upon determining that an entire data packet, in this case two bytes with 8 data bits D7-D0 each, has been received, responds by releasing the clear-to-send signal CTS. This signals the end of the transmission to the transmitter 101, which reverts to receive mode 401 upon detecting releasing of the clear-to-send signal CTS. In order to ensure that the apparatus 109 reverts to idle mode after completion of a data transmission, the transmitter 101 should release the clock signal CLK and/or the data signal DAT, particularly if any of these is in an asserted state upon transmission of the last data bit D0. Correspondingly, the receiver 102 should not release the clear-to-send signal CTS before detecting that the transmitter has released the clock signal CLK and the data signal DAT. As shown in FIG. 3a, the transmitter 101 may keep track of the number of data bits transmitted, and may revert to receive mode and/or release the clock signal CLK and/or the data signal DAT after detecting the toggling of the data-acknowledge signal ACK for the last data bit D0 and upon determining that an entire data packet has thus been transmitted, i.e. without awaiting releasing of the clear-to-send signal CTS from the receiver 102. Alternatively, in the case that an even number of data bits were transmitted, the receiver 102 may refrain from toggling the data-acknowledge signal ACK upon reading the last data bit D0 and may in any case release the data-acknowledge signal ACK after the last toggling thereof. The apparatus thus allows the transmitter 101 and the receiver 102 to end data transmission in a fast and reliable way requiring only a minimum of processing resources.

FIG. 3b shows initiation of data transmission in the case of a contention, i.e. simultaneous attempts to initiate a transmission by both processors 101, 102. As described above, a processor 101, 102 initiating a transmission, detects a contention by detecting that instead of the clear-to-send signal CTS, the data-acknowledge signal ACK is asserted by the respective other one of the processors 101, 102. The contention may be resolved in a way well known in the art, namely in that one of the processors 101, 102 subsequently takes on the role of winner while the respective other one takes on the role of loser. In the following, the resolution of the contention is described as taking place with the first processor 101 having the role of winner and the second processor 102 having the role of loser.

In FIG. 3b, signals CLK, DAT, CTS, ACK are shown from the perspective of the loser, i.e. the second processor 102, however with the line functions CLK, DAT, CTS, ACK according to the second mode of the apparatus, wherein the second processor 102 is in a transmit mode 301 as shown in FIG. 2. The loser 102 initiates a transmission by asserting the clock signal CLK. Simultaneously, the winner 101 does the same—however, assuming line functions according to FIG. 1. The loser 102 detects this as an assertion of the acknowledge signal ACK instead of the clear-to-send signal CTS and thus detects the contention. In response hereto, and due to having the role of loser, the loser 102 releases the clock signal CLK, reverts to receive mode 401 and asserts the clear-to-send signal CTS—assuming line functions as in FIG. 1. Thus, the loser 102 asserts the clear-to-send signal CTS by asserting the signal on the second line, which functions as data line DAT in the transmit mode 301 of the loser 102 and as clear-to-send line CTS in the receive mode 401 of the loser 102. Note that in FIG. 3b, the line functions are designated like in FIG. 2, and that the shown designation of line functions only applies before, i.e. to the left of, the releasing of the clock signal CLK.

The winner 101 may also detect the contention as described above. However, due to having the role of winner, the winner 101 maintains its transmit mode 301 and awaits resolution of the contention. The winner 101 thus awaits releasing of the acknowledge signal ACK, i.e. the CLK signal from the loser 102 in transmit mode 301, and assertion of the clear-to-send signal CTS from the loser 102 in receive mode 401. Note that the winner 101 does not need to monitor both of these signals ACK, CTS, since the loser 102 may be programmed or otherwise configured to respectively release the CLK signal and assert the clear-to-send signal CTS in a predefined order, such as releasing the CLK signal before asserting the clear-to-send signal CTS. In this case, the winner 101 may be configured to be ignorant of contentions, since, as described above for FIG. 3a, it will not start transmission of data bits D7-D0 before detecting assertion of the clear-to-send signal CTS, anyway.

The roles of winner and loser may be fixed by design, such as e.g. the first processor 101 always having the role of winner and the second processor 102 always having the role of loser. Alternatively, the winner and loser roles may be allocated dynamically, e.g. in dependence on arbitrary states of the apparatus and/or the processors 101, 102. The apparatus 109 may e.g. comprise a contention controller (not shown) that allocates the winner and loser roles in dependence on one or more input signals received from another component of the apparatus and/or from a device external to the apparatus. Alternatively, or additionally, one or both of the processors 101, 102 may be configured to take on the role of loser after detecting that the duration of a contention has exceeded a predefined time period and/or a randomly determined time period, such that the winner and loser roles may be allocated more or less at random.

Figure 4:
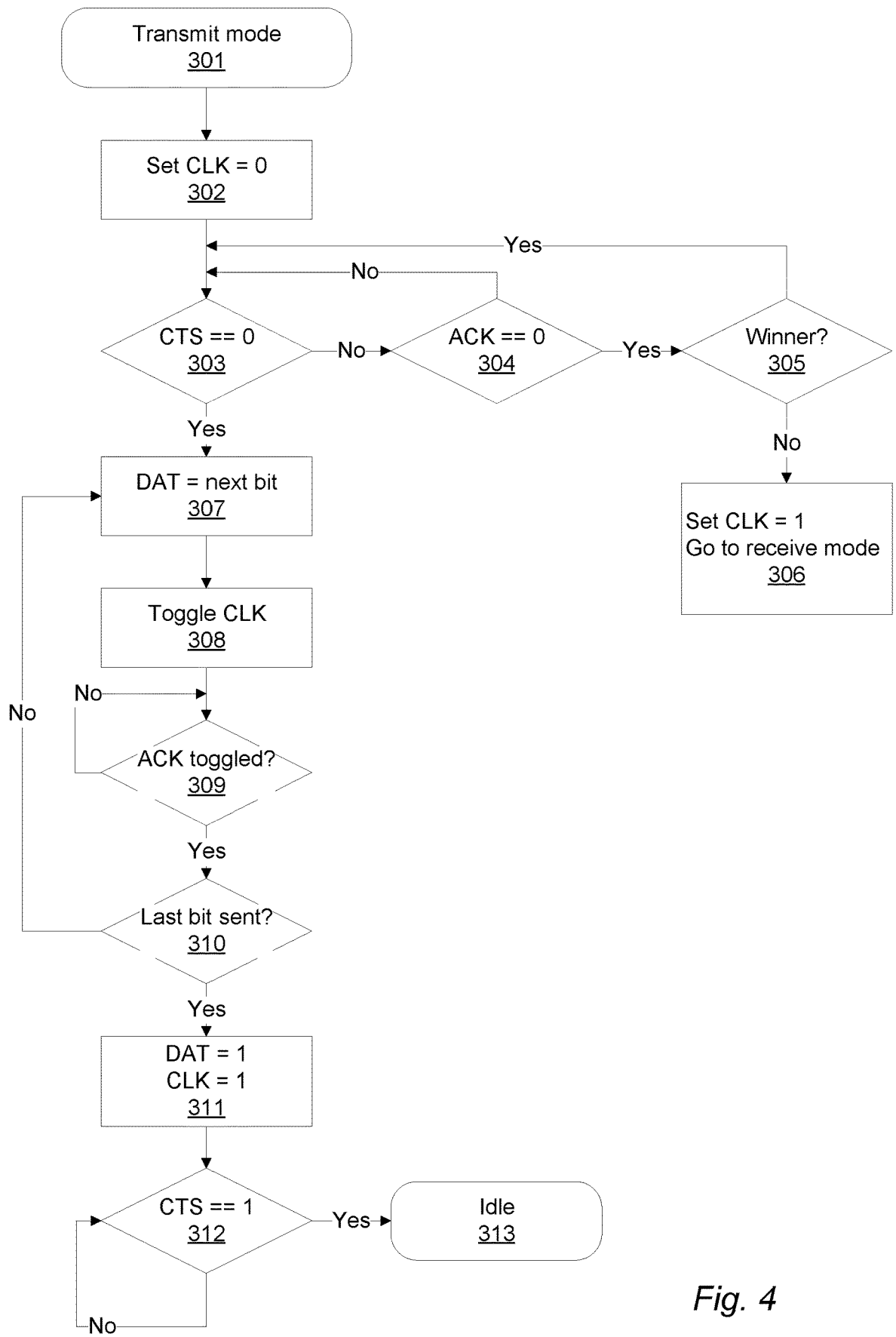
FIG. 4 shows a flowchart for a processor in a transmit mode.

FIG. 4 shows a flowchart for a transmit mode 301 for a processor, such as one or both of the processors 101, 102 shown in FIGS. 1 and 2. As can be seen in FIG. 1, wherein the first processor 101 is in a transmit mode 301 and thus has the role of transmitter, the first line CLK and the second line DAT are outputs from the transmitter while the third line CTS and the fourth line ACK are inputs to of the transmitter. Similar observations can be derived from FIG. 2 with respect to the second processor 102. Generally, signals are shown as in FIG. 3a, i.e. as 'idle high', such that 'high' corresponds to the respective signal being in the released state and 'low' corresponds to the respective signal being in the asserted state. In the flowchart, a released signal, 'high', is indicated by the single digit '1', and an asserted signal, 'low', is indicated by the single digit '0'.

The transmitter initiates communication with a receiver in a first step 302 by asserting the clock signal CLK, here shown as setting the corresponding pin 'value' to '0', to indicate a request to send. Then, in steps 303 and 304, the transmitter awaits assertion by the receiver of one of the clear-to-send signal CTS and the data-acknowledge signal ACK. The transmitter thus in step 303 determines the 'value' of the input pin receiving the clear-to-send signal CTS and in the case of the value being equal to '0', here indicating an asserted signal, proceeds to transmit data in step 307, while otherwise, i.e. in the case of the value being equal to '1', here indicating a released signal, proceeds to step 304. In step 304, the transmitter determines the state of the data-acknowledge signal ACK from the receiver and in the case that it is asserted, proceeds to step 305. Otherwise, the transmitter resumes waiting in step 303. In step 305, the transmitter determines whether it has the role of winner and in that case resumes waiting in step 303, or whether it has the role of loser and in that case proceeds to step 306, wherein it releases the clock signal CLK and reverts to receive mode (see FIG. 5).

In step 307, the transmitter asserts or releases the data signal DAT in dependence on the value of the next data bit to transmit. The data bit is designated 'next bit' to indicate that typically a sequence of data bits, such as a packet of data bits, is transmitted bit-by-bit from a first data bit to a last data bit. The data bits may e.g. be taken from an output buffer as well known in the art. The transmitter then proceeds to step 308, wherein it toggles the clock signal CLK to indicate that the next data bit is ready for being read by the receiver. The transmitter then in step 309 awaits toggling of the data-acknowledge signal ACK by the receiver. Upon detecting toggling of the data-acknowledge signal ACK, the transmitter proceeds to step 310, wherein it determines whether the last data bit in the data packet has been sent and in that case proceeds to step 311, while otherwise resuming step 307 to iterate transmission of the next following data bit. In step 311, the transmitter releases the data signal DAT and the clock signal CLK. Note that the receiver will typically not be able to distinguish these two signal releases from a normal transmission of a data bit. Thus, the receiver must be able to determine the end of a data packet in other ways, such as e.g. by counting the number of data bits received and/or by detecting a predefined termination pattern in the received data bits. The transmitter then in step 312 awaits releasing of the clear-to-send signal CTS by the receiver, and upon detecting releasing of the clear-to-send signal CTS, the transmitter enters an idle mode wherein the transmitter is idle; otherwise it resumes waiting in step 312. The idle mode preferably equals a receive mode. When the transmitter is in the idle mode, the apparatus would normally also be in its idle mode until a subsequent data transmission is initiated.

Figure 5:
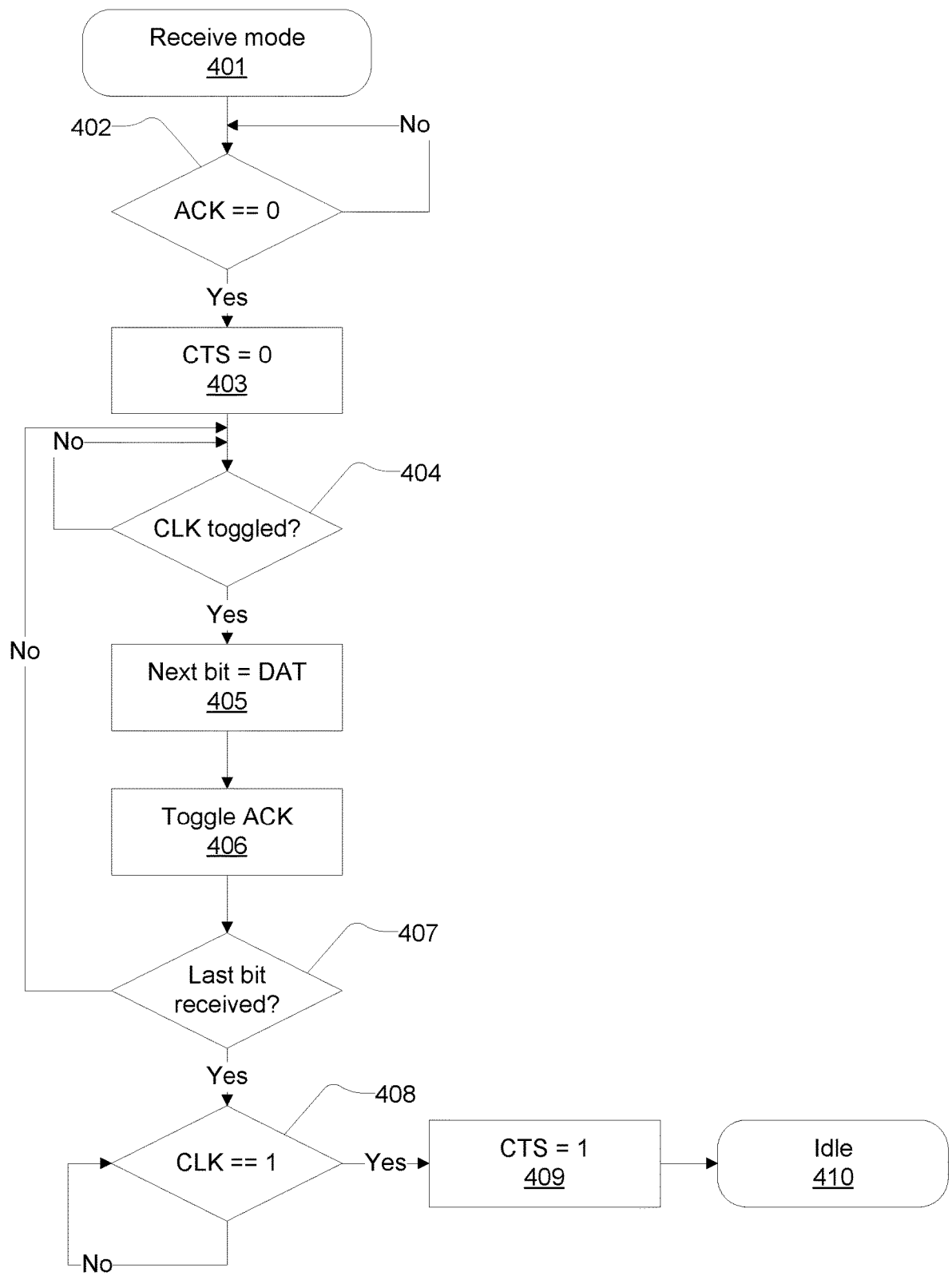
FIG. 5 shows a flowchart for a processor in a receive mode.

FIG. 5 shows a flowchart for a receive mode 401 for a processor, such as one or both of the processors 101, 102 shown in FIGS. 1 and 2. As can be seen in FIG. 1, wherein the second processor 102 is in a receive mode 401 and thus has the role of receiver, the first line CLK and the second line DAT are inputs to the receiver while the third line CTS and the fourth line ACK are outputs from the receiver. Similar observations can be derived from FIG. 2 with respect to the first processor 101.

In a first step 402, the receiver awaits assertion of the clock signal CLK by the transmitter, which thereby indicates a request to send data. Upon detection of assertion of the clock signal CLK, the receiver proceeds to receive data in step 403, while otherwise resuming waiting in step 402. In step 403, the receiver asserts the clear-to-send signal CTS to indicate to the transmitter that the receiver is ready to receive data. The receiver then proceeds to step 404 to await toggling of the clock signal CLK by the transmitter. Upon detection of toggling of the clock signal CLK, the receiver proceeds to read the next data bit in step 405, while otherwise resuming waiting in step 404. In step 405, the receiver reads a data bit, denoted the next bit, by decoding the state of the data signal DAT and then proceeds to step 406, wherein the receiver toggles the data-acknowledge signal ACK to acknowledge successful reading of the data bit. The data bit may be written to an input buffer for further processing as well known in the art. The receiver then proceeds to step 407.

The receiver keeps track of whether the last bit in the data packet has been received. In some embodiments, the transmitter may encode a portion of the data bits, e.g. a first byte thereof, to represent the length of the data packet. In other embodiments, the length of the data packet may be fixed. In other embodiments, the end of the data packet may be indicated by a predefined termination pattern in the data bits. Thus, in step 407, the receiver determines whether the last bit has been received and in this case proceeds to step 408, while otherwise iterating receiving of further data bits in step 404. In step 408, the receiver awaits releasing of the clock signal CLK by the transmitter. Upon detection of releasing of the clock signal CLK, the receiver proceeds to step 409 in which it releases the clear-to-send signal CTS to indicate the end of data transmission to the transmitter, while otherwise resuming waiting in step 408. In order to prevent deadlocks, the receiver may use a timeout counter to determine waiting time spent in step 408 and proceed to step 409 in the case that the waiting time exceeds a predefined time limit. Similarly, the transmitter and/or the receiver may implement a timeout to prevent deadlocks in a contention. From step 409, the receiver proceeds to an idle mode in step 410. The idle mode preferably equals the receive mode. When the receiver is in the idle mode, the apparatus would normally also be in its idle mode until a subsequent data transmission is initiated.

Due to the relatively few states and transitions required and shown in the flowcharts in FIGS. 4 and 5, any of the transmit mode 301 and the receive mode 401 may preferably be implemented as a state machine or finite automaton, which may enable an effective implementation of the control logic governing data communication in the apparatus 109.

The first processor 101 and the second processor 102 may perform multiple processes concurrently and only occasionally perform operations related to the roles of transmitter and receiver. In connection therewith, the sequence of data bits constituting a data packet may be reliably transmitted at the fastest speed possible also in situations wherein one or both of the processors are busy performing other processes than those related to the serial communication with each other. The processors may prioritize other processes over those processes related to the serial communication with each other.

In addition thereto, the transmitter and the receiver roles and associated functions may be implemented by very compact hardware means and software means. Thereby, the processors may each be equipped with a serial port, e.g. an additional serial port, at the cost of only very limited hardware and/or software resources.

It is appreciated that sometimes the apparatus 109 is in the first mode, wherein the first processor 101 is a transmitter and the second processor 102 is a receiver interacting to transfer the data bits from the transmitter to the receiver using the lines as set out above. At other times, the roles are swapped, and the first processor 101 is a receiver and the second processor 102 is a transmitter interacting to transfer data bits in the opposite direction. To achieve this, the apparatus reassigns line functions to the lines connecting the pins 11-14, 21-24 and thereby maintains input pins configured as inputs and output pins configured as outputs irrespective of the direction in which the data bits are transferred.

The transfer of the data bits between the processors 101, 102 may take place via digital input/output pins, such as GPIO pins. This is advantageous when no dedicated hardware interfaces for serial data communication, such as I2C, are available on one or both of the processors, e.g. because such interfaces are occupied (used for other purposes) or because one or both of the processors is/are not configured with such a hardware interface. GPIO pins requires a minimum of hardware resources and are often available on a processor in relatively large number compared to serial ports such as I2C ports.

Another advantage is that data transfer can be performed reliably and at a relatively high data rate in situations where one of the processors 101, 102 receives or transmits the data bits at a slower data rate than the other one transmits or receives. Since the slower processor has full control of the rate of the data transfer, a risk of (over-) exhausting the slower processor is kept low while the data rate is as fast as the slower processor can keep up with. This enables the apparatus to work more reliable and stable.

The disclosed apparatus 109 allows the transmitter and the receiver to initiate and end transmission of a sequence of data bits in a fast and reliable way that requires a minimum of processing resources.

The disclosed apparatus and handshake scheme provide a reliable confirmation of handoff of the sequence of data bits from one processor to the other processor. The first processor and the second processor may then proceed to other computational tasks without spending further computational resources on waiting for completion of the transmission.

A data transmission may be requested by the transmitter simply by asserting the clock signal CLK until the receiver detects that the transmitter has resources to receive, which the receiver may then acknowledge by asserting the clear-to-send signal CTS. This allows the receiver time to respond until it can free up appropriate resources, which may temporarily be occupied e.g. by other tasks or processes.

To mediate, in case of conflicting requests to send, i.e. both processors 101, 102 request to send at the same time by asserting their respective clock signals CLK, there may be designated a winning processor or winner, which prevails. In some embodiments, the designated winner may be the processor that has the least resources available for the communication of the data bits and associated buffering of the data bits, such that a smooth working of the processors can be achieved.

The transmitter may inform the receiver of how many data bits to expect. As explained above, the receiver may keep track of the number of data bits received to detect a last data bit and/or to detect a pattern encoded in the data bits indicating that the transmission of the sequence of data bits is completed.

In some embodiments, preassigned data bits may be located in a header portion of the data packet or sequence of data bits. The sequence of data bits may also comprise a payload portion following the header portion. The header portion may have a fixed length known by both transmitter and receiver and the payload portion may have a variable length, and the actual length may be represented by the preassigned data bits.

One or more of the first processor 101 and the second processor 102 may perform the detecting that a signal is asserted, released and/or toggled via a hardware interrupt. Hardware interrupt circuits may be connected to detect a signal change on pins configured for input. Hardware interrupt circuits require only limited hardware resources, whereas a full I2C or UART hardware interface additionally requires e.g. a stable hardware clock circuit.

One or both of the processors 101, 102 may be loaded with a respective program to implement the receiver and transmitter roles as defined above e.g. using polling and/or reacting to interrupts to detect changes of signal states on input pins. An advantage of the apparatus is that data transfer can be performed reliably and at a relatively high data rate, considering that data transfer may take place via input/output pins such as GPIO pins.

In some embodiments, the apparatus may comprise two, three, four or more lines for exchanging data signals. In such embodiments, the processors 101, 102 may exchange multiple data bits in parallel in the same way as the above-described exchange of single data bits. The apparatus 109 and the processors 101, 102 are preferably configured to reverse the transmission directions of the additional data lines and the additional processor pins required to control and read signals on those lines when changing between the first mode and the second mode of the apparatus. In this way, the data rate of the communication may be doubled, tripled, quadrupled or further multiplied using the same simple handshake as described for the single-bit communication above and using a minimum of processor pins and interconnecting lines. Note that the signals on such additional lines are not required to have any particular state in the idle mode of the apparatus.

The invention is not limited to the embodiments disclosed herein, and the invention may be embodied in other ways within the subject matter defined in the following claims. As an example, features of the described embodiments may be combined arbitrarily, e.g. in order to adapt the devices according to the invention to specific requirements.

Any reference numerals and names in the claims are intended to be non-limiting for their scope.

The invention claimed is:

1. An apparatus comprising a first processor and a second processor, each having a first logic output pin, a second logic output pin, a first logic input pin and a second logic input pin, wherein:

for each of the first and the second processor, the first logic output pin is connected to the second logic input pin of the respective other processor;

for each of the first and the second processor, the second logic output pin is connected to the first logic input pin of the respective other processor;

each of the first and the second processor is operable in a transmit mode for transmitting data to the respective other processor by controlling the second logic output pin to provide a logic data signal (DAT) indicating a sequence of data bits (D7-D0) and controlling the first logic output pin to provide a logic clock signal (CLK) with state transitions indicating when the logic data signal (DAT) indicates the values of the individual data bits (D7-D0) in the sequence; and each of the first and the second processor is operable in a receive mode for receiving data from the respective other processor by determining a sequence of data bits (D7-D0) from the logic data signal (DAT) received on the first logic input pin in response to state transitions of the logic clock signal (CLK) received on the second logic input pin;

characterized in that each of the first and the second processor further is configured to: in dependence on being in the receive mode and able to receive data, control the second logic output pin to provide a logic clear-to-send signal (CTS) indicating the ability to receive data and control the first logic output pinto provide a logic data-acknowledge signal (ACK) with state transitions indicating successful reception of individual data bits (D7-D0); and in dependence on being in the transmit mode, delay transmission of the first data bit (D7-D0) in the sequence until determining that the logic clear-to-send signal (CTS) indicates the ability to receive data by the respective other processor and delay transmission of each subsequent data bit (D7-D0) in the sequence until determining a state transition of the logic data-acknowledge signal (ACK) that indicates successful reception of the respective previous data bit (D7-D0) by the respective other processor.

2. An apparatus according to claim 1, wherein:

the first processor further is configured to initiate a data transmission and thereby enter the transmit mode by controlling the first logic output pin to assert the logic clock signal (CLK) to indicate a request to send to the second processor; and the second processor further is configured to, in dependence on being in the receive mode and able to receive data, control the second logic output pin to assert the logic clear-to-send signal (CTS) to indicate the ability to receive data to the first processor in response to determine assertion of the logic clock signal (CLK) from the first processor.

3. An apparatus according to claim 2, wherein:

the second processor further is configured to, in dependence on being in the receive mode, determine when the last data bit of the sequence has been received from the first processor and to control the second logic output pin to release the logic clear-to-send signal (CTS) to indicate end of reception to the first processor in response to determine reception of the last data bit from the first processor; and the first processor further is configured to revert to the receive mode in response to determining releasing of the logic clear-to-send signal (CTS) by the second processor.

4. An apparatus according to claim 3, wherein the first processor further is configured to:

in dependence on being in the transmit mode, determine when the last data bit of the sequence has been transmitted to the second processor; and in response to determine transmission of the last data bit to the second processor, control the first logic output pin to release the logic clock signal (CLK) and/or control the second logic output pin to release the logic data signal (DAT).

5. An apparatus according to claim 4, wherein:

the second processor further is configured to delay releasing of the logic clear-to-send signal (CTS) to indicate end of reception to the first processor until determining that the signals on the first and the second logic input pin are both in the released state.

6. An apparatus according to claim 5, wherein:

the second processor further is configured to initiate a data transmission and thereby enter the transmit mode by controlling the first logic output pin to assert the logic clock signal (CLK) to indicate a request to send to the first processor.

7. An apparatus according to claim 6, wherein:

the second processor further is configured to, in dependence on being in the transmit mode, determine a contention in response to determining assertion of the signal on the second logic input pin and thereby detecting a request to send by the first processor; and the second processor further is configured to resolve a determined contention by releasing the logic clock signal (CLK) to cancel the request to send to the first processor (101) and thereby revert to the receive mode.

8. An apparatus according to claim 7, wherein:

the second processor further is configured to always resolve the determined contention; or alternatively, the second processor further is configured to resolve the determined contention in dependence on detecting that the duration of the determined contention has exceeded a predefined time period and/or a randomly determined time period.

9. An apparatus according to claim 8, wherein:

the first processor further is configured to encode preassigned data bits in the transmitted sequence to represent the number of bits in the sequence; and the second processor further is configured to decode the preassigned data bits in the sequence received from the first processor to acquire the number of bits in the sequence, thereby enabling the second processor to determine when the last data bit of the sequence has been received from the first processor.

10. An apparatus according to claim 9, wherein any of the first processor and the second processor is programmable and comprises a program memory for storing an executable program configured to cause the processor to perform operations related to transmitting and/or receiving data to/from the respective other processor.

11. An apparatus according to claim 10, wherein in any of the first processor and the second processor:

one or more of the first and the second logic output pin and/or one or more of the first and the second logic input pin comprises a general-purpose input/output pin; and the processor configures the general-purpose input/output pin as output or input in dependence on the executable program.

12. An apparatus according to claim 11, wherein the first processor and the second processor are interconnected by wired communication lines.

13. An apparatus according to claim 12, wherein the first processor and the second processor are arranged on a circuit board; and wherein the wired communication lines comprise paths or lanes in an electrically conductive layer of the circuit board.

14. A listening device comprising an apparatus according to claim 13 and further comprising a microphone and an electro-acoustic transducer, wherein:

at least one of the microphone and the electro-acoustic transducer is coupled to the first processor or the second processor; and one or both of the first processor and the second processor comprises a digital amplifier, a digital signal processor and/or a wireless transceiver.

15. The device of claim 14 including a non-transitory storage medium including an executable program instructions for causing a processor to exchange data with another processor, wherein the executable program instructions comprise code enabling the processor to perform operations for transmitting and receiving data to/from the other processor, thereby enabling the processor and the other processor to cooperate to emulate an apparatus.

* * * * *